United States Patent [19]

Mizusawa

[11] Patent Number: 4,488,206
[45] Date of Patent: Dec. 11, 1984

[54] LAMP HOUSING FIXING STRUCTURE
[75] Inventor: Akira Mizusawa, Fujisawa, Japan
[73] Assignee: Nifco Inc., Yokohama, Japan
[21] Appl. No.: 394,186
[22] Filed: Jul. 1, 1982
[30] Foreign Application Priority Data
  Jul. 1, 1981 [JP] Japan .............. 56-96713[U]
[51] Int. Cl.³ .................. B60Q 1/26; F16B 19/00
[52] U.S. Cl. .................................... 362/226; 24/289;
  24/297; 248/27.3; 362/80; 362/83; 362/365;
                                         403/406; 411/508
[58] Field of Search .............. 362/61, 78, 80, 83,
  362/226, 362, 364, 365, 366, 368, 369, 370, 371,
  374, 375, 432, 350; 24/245 R, 245 A, 246, 248
  E, 252 R, DIG. 11, 289, 297; 248/27.1, 27.3;
                312/242; 403/406; 411/508-510

[56] References Cited
U.S. PATENT DOCUMENTS

| 2,030,135 | 2/1936 | Carpenter | 24/DIG. 11 |
|---|---|---|---|
| 3,503,568 | 3/1970 | Galley | 24/DIG. 11 |
| 3,794,278 | 2/1974 | Frey et al. | 248/27.3 |
| 3,799,483 | 3/1974 | Chiappinelli | 248/27.3 |
| 4,080,685 | 3/1978 | Vanderpool | 362/61 X |
| 4,318,158 | 3/1982 | Livermore et al. | 362/368 X |
| 4,373,826 | 2/1983 | Inamoto et al. | 403/406 X |
| 4,379,648 | 4/1983 | Tanaka et al. | 403/406 X |

FOREIGN PATENT DOCUMENTS

| 1480638 | 4/1970 | Fed. Rep. of Germany | 362/362 |
|---|---|---|---|
| 2001708 | 10/1970 | Fed. Rep. of Germany | 362/226 |
| 2029914 | 1/1971 | Fed. Rep. of Germany | 362/365 |
| 2522629 | 12/1976 | Fed. Rep. of Germany | 362/80 |
| 2221689 | 10/1974 | France | 362/350 |
| 1357738 | 6/1974 | United Kingdom | 403/406 |
| 2088543 | 11/1980 | United Kingdom | 362/61 |

Primary Examiner—David H. Brown
Assistant Examiner—John E. Griffiths, Jr.
Attorney, Agent, or Firm—Schwartz & Weinrieb

[57] ABSTRACT

A plurality of plastic fastener members each provided with a fixing part, a resilient piece, and an engaging face are attached fast to the side walls of the lamp housing for an automobile. When the lamp housing is inserted into an insertion hole formed in advance in the body panel of the automobile, the engaging faces of the fastener members come into fast engagement with the rear side of the edge of the insertion hole. Thus, the lamp housing is safely fastened to the automobile body by one action.

9 Claims, 9 Drawing Figures

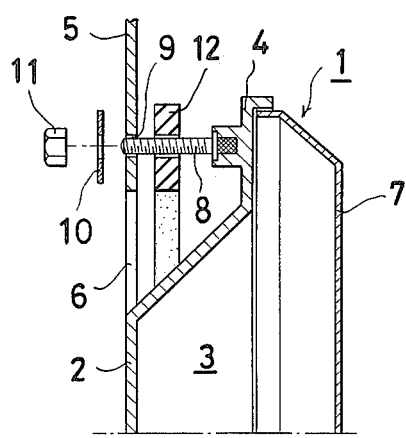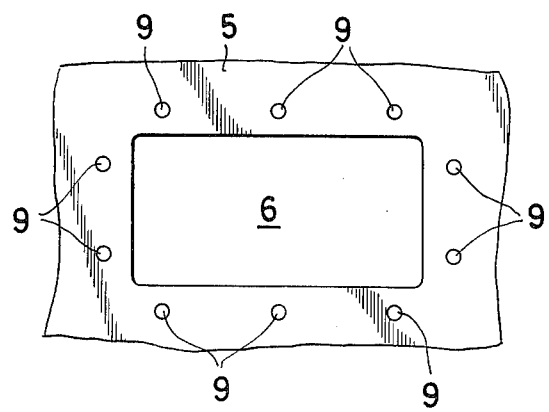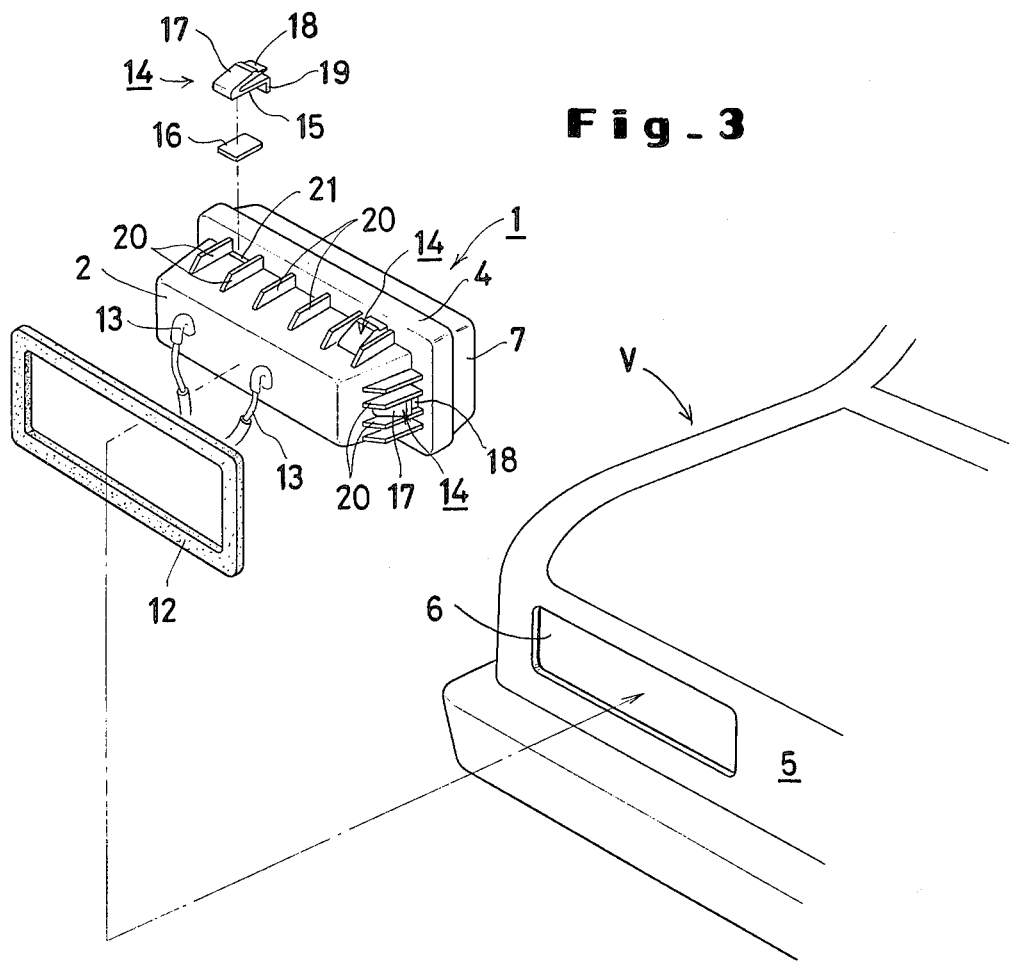

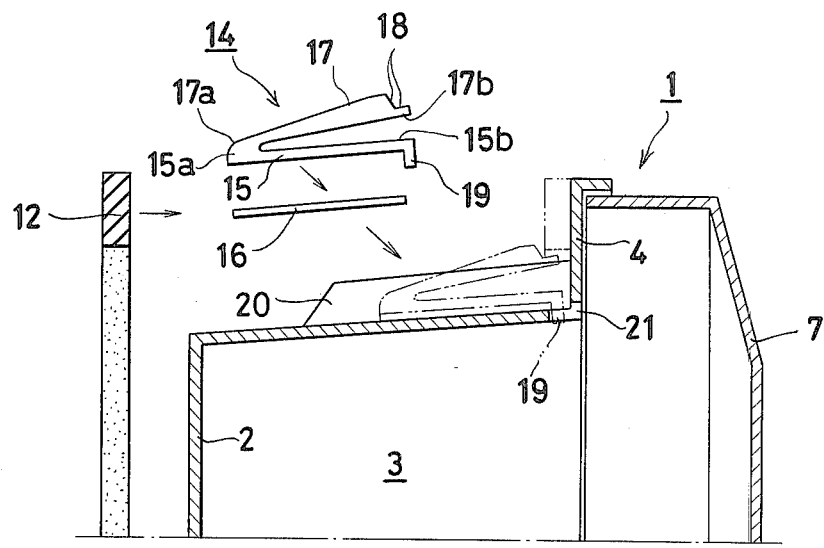
Fig_4
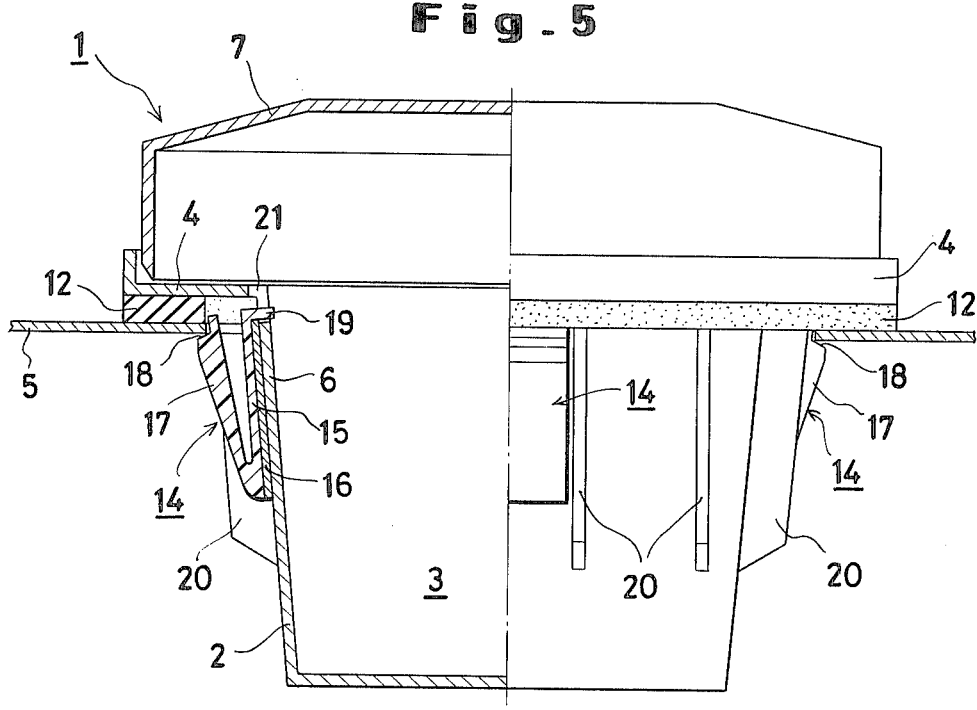
Fig_5

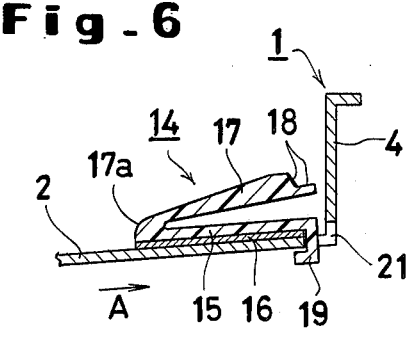
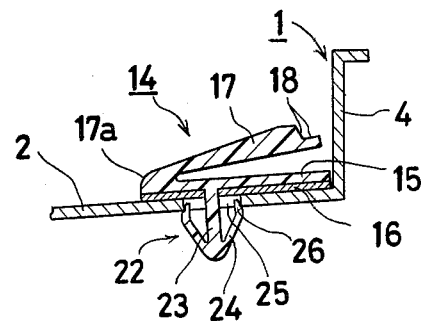
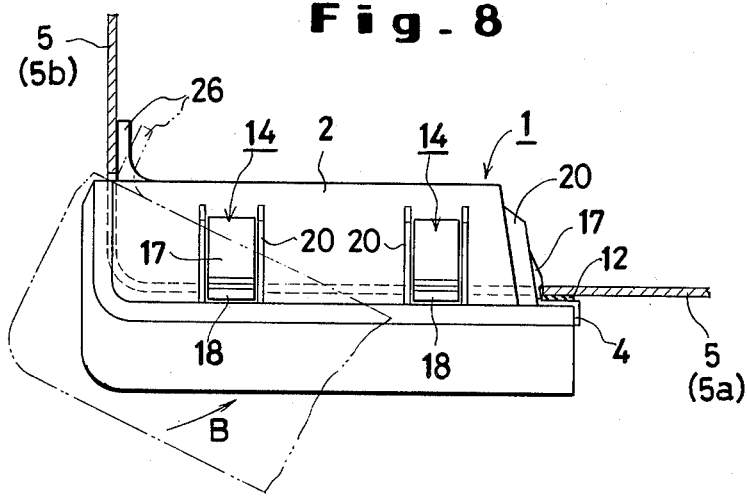
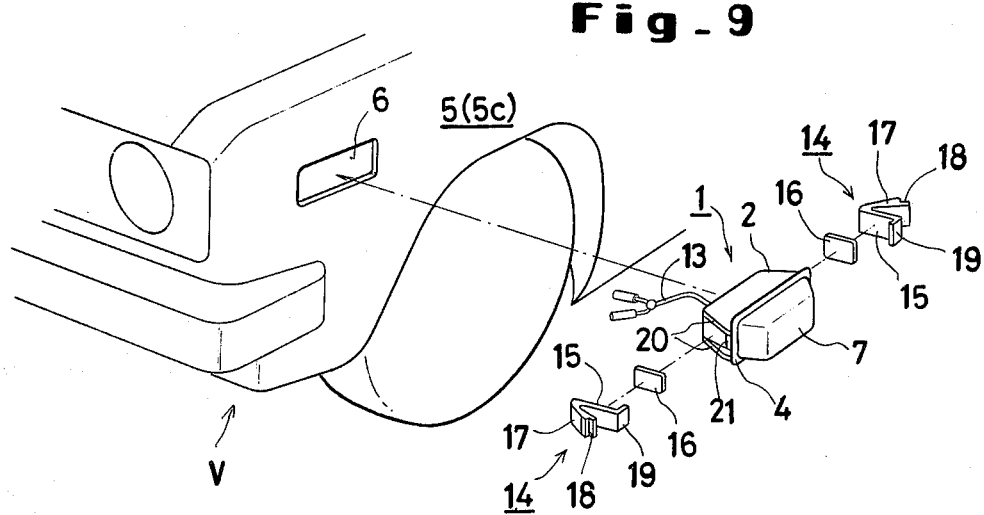

LAMP HOUSING FIXING STRUCTURE

FIELD OF THE INVENTION

This invention relates to a fixing structure designed to secure on body panels of automobiles, plastic housings encasing rear combination lamps, side markers, and other lamps for attachment to such body panels

BACKGROUND OF THE INVENTION

Heretofore, fast attachment of plastic lamp housings of the class mentioned above to body panels of automobiles has been generally accomplished by use of bolts and nuts. Exposure to view of the heads of such bolts used in the plastic lamp housings is detestable because these plastic lamp housings serve as ornamental parts in the overall appearance of automobiles in addition to fulfilling their basic function of protecting the lamps encased therewith. To prevent the bolts from such exposure, the bolts are inserted in position within the plastic housings when the housings are injection molded with plastics.

A typical conventional structure in which bolts are inserted in plastic housings as described above is illustrated in FIG. 1. This structure will be described below with reference to FIG. 1. First, the common structure of a housing 1 itself will be described. A lamp case 2 in the shape of a box serves to encase a lamp (not shown). A space 3 for receiving the lamp in the lamp case is provided on the edge surrounding the opening thereof with flanges 4. These flanges 4 are destined to come into contact with the front surface of a body panel 5 of an automobile, while the lamp case 2 is inserted through an insertion hole 6 perforated in the body panel 5 and set in position inside the shell of the automobile.

To the front sides of the flanges is attached a cover 7 permeable to light. The cover serves to protect the lamp held inside and, at the same time, permit passage of light issuing from the lamp within the lamp case. The relation of the union between the lamp case 2 and the cover 7 has no bearing whatever upon the present invention, because this invention as will become apparent from further disclosure of the invention made hereinbelow, is applicable to any lamp housing 1 on the condition that the housing is provided with such flanges 4 as mentioned above and also with a lamp case 2.

For attachment of the housing 1 of this type to the body panel 5, convention has prescribed that weld bolts 8 be insert molded in the flanges 4 of the housing 1 at the time that the housing 1 is injection molded with plastics, these weld bolts 8 be inserted through perforations 9 (refer also to the diagram of FIG. 2 illustrating the front side of the body panel) and thrust out of the rear side of the panel at the same time that the lamp case 2 is sunken through the insertion hole 6, washers 10 be slid over the projected bolts from behind the rear side of the panel, and nuts 11 be threaded upon the bolts. Generally, a seal packing 12 is nipped between the flanges 4 of the housing 1 and the panel 5.

The fixing structure of this principle, however, suffers from numerous drawbacks such as, for example:
(1) The insert molding of bolts 8 is a troublesome work which takes up much time and calls for much cost.
(2) When tie insert molding of bolts is effected in a large lamp housing, the strain of resin which ensues during the curing of the housing poses itself a serious problem. The strain is so serious as to render it difficult for the bolts to be retained in a straight upright position. With the insert molding, therefore, it is difficult to ensure high dimensional accuracy in the fixing of the housing on the automobile body.
(3) The fixing structure entails the so-called two-face work across the panel, that is, one work for inserting the housing on the front side of the panel 5 and the other work for rotatably driving nuts 11 round the bolts on the rear side of the panel 5. This is highly inefficient, time-consuming work which requires use of tools.
(4) As regards the work for boring holes in the body panel 5, the fixing structure under discussion necessitates formation of perforations 9 to be used exclusively for insertion of bolts around the edge of the insertion hole 5 formed for the insertion of the lamp case 2 as illustrated in FIG. 2. The boring work itself is troublesome and the work of positioning the perforations accurately relative to the insertion hole and relative to one another is not easy.
(5) The seal packing 12 is naturally required to be perforated to permit passage of the bolts 8. The relevant portions of the sealing area are consequently sacrificed.
(6) When housings of similar sizes are fixed at different positions, the positions of bolts inserted in the housings are different. After all, different metal dies are required for the injection molding of such housings despite their similar sizes. This calls for both time and cost.

As an improvement over such a conventional fixing structure, there has been proposed a fixing structure having anchor-shaped plastic fasteners integrally molded with a housing in place of such bolts (Japanese Utility Model Disclosure No. SHO 52(1977)-135772). With this particular fixing structure, the last three (4), (5), and (6) of the aforementioned drawbacks still persist, although the first three drawbacks (1), (2), and (3) are no longer suffered.

Apart from the disadvantage, the work of molding fasteners, which are extremely small as compared with the housing and which require high dimensional accuracy, in conjunction with the housing in one and the same mold is irrational in the first place. Some fasteners have complicated shapes such that they cannot be released from a mold unless the mold is separable along a plurality of planes. Such a mold is too expensive to render the device itself feasible.

SUMMARY OF THE INVENTION

In view of the state of affairs mentioned above, the present invention is aimed at providing a lamp housing fixing structure which eliminates all the aforementioned drawbacks suffered by the conventional fixing structure.

In accordance with this invention, plastic fastener members each provided with fixing parts adapted for attachment to the side wall of the lamp case, a resilient piece, and an engaging surface are attached in advance to side walls of the lamp case. When the lamp housing having the plastic fastener members attached in position on the lamp case is inserted into the insertion hole bored in the body panel of an automobile, the aforementioned engaging surfaces come into fast engagement with the rear edge of the insertion hole. Thus, the lamp housing can be safely fastened to the body panel in one action.

BRIEF DESCRIPTION OF THE DRAWINGS:

Other objects and features of the invention will become apparent to those skilled in the art as the disclosure is made in the following description of a preferred embodiment of the invention, as illustrated in the accompanying sheet of drawings.

FIG. 1 is a longitudinal cross section illustrating a conventional lamp housing fixing structure.

FIG. 2 is an explanatory diagram illustrating the condition in which perforations are formed in the body panel of an automobile to permit application of the fixing structure of FIG. 1.

FIG. 3 is a perspective view illustrating a typical lamp housing fixing structure of the present invention in a partially disassembled state.

FIG. 4 is a sectioned side view illustrating the condition in which the fixing structure of the present invention is set in position.

FIG. 5 is a partially sectioned plan view illustrating the condition in which the lamp housing using the fixing structure of the present invention is fixed in position in the body panel.

FIG. 6 is a cross section illustrating a typical plastic fastener member for use in the fixing structure of the present invention.

FIG. 7 is a cross section illustrating another typical plastic fastener member for use in the fixing structure of the present invention.

FIG. 8 is a schematic explanatory diagram illustrating a second embodiment of the fixing structure of the present invention.

FIG. 9 is an exploded perspective view illustrating a third embodiment of the fixing structure of the present invention.

DESCRIPTION OF THE PREFERRED EMBODIMENT

FIGS. 3–5 represent an application of the present invention to the rear combination lamp housing in an automobile. In FIG. 3, a rough sketch of the rear part of an automobile V to which the lamp housing is to be fixed is also included. In the case of the present invention, the insertion hole 6 for receiving the lamp case 2 of the lamp housing is the only opening to be formed in the body panel 5 of the automobile to permit attachment of the lamp housing 1 to the automobile. The perforations 9 which are formed along the edge of the insertion hole 6 in the conventional fixing structure of FIGS. 1-2 for permitting the attachment of bolts or plastic fasteners are no longer necessary in the fixing structure of this invention.

The lamp housing 1 consists of a lamp case 2 and a transparent cover 7 in the front side. Similarly to the counterpart in the conventional fixing structure, the lamp case 2 has a flange 4 which is extended outwardly from the edge of the opening of the lamp case so as to engage with the body panel. In FIG. 3, the electric wires 13 for the lamp (not shown) held inside the lamp case 2 are shown as pierced through the bottom of the lamp case 2. In the following description of the invention and in the other drawings, the electric wires and the lamp are omitted for the sake of simplicity.

In the present invention, the plastic fastener members serving to secure the lamp housing 1 to the body panel 4 are not required to be integrally molded with the flange 4 or embedded in the flange 4 as found in the conventional fixing structure. They are separate components designed to be attached to the side walls of the lamp case 2.

Now, the fastener member 14 of the present embodiment will be described. It is provided with a fixing part 15 adapted to be attached to the side wall of the lamp case 2. In the present embodiment, use of a two-faced adhesive tape is contemplated for the attachment of the fixing part 15 to the side wall. This fixing part 15 has a flat planar rear surface which permits ready attachment of an adhesive tape 16.

To one end 15a of the fixing part 15 of the shape of a plate, a basal end 17a of a resilient piece 17 continues. This resilient piece 17 extends from the basal end 17a mentioned above to the free end 17b on the opposite side, in a direction generally parallel to the fixing part 15 but gradually separating outwardly therefrom. At the free end 17b, an engaging surface 18 which is adapted to come into fast engagement with the edge of the insertion hole 6 formed in the body panel for admitting the lamp case (hereinafter referred to simply as "insertion hole") is formed on an outward side, as will be more fully described in a later paragraph.

In the present embodiment, the fixing portion 15 is desirably provided at the other end 15b opposite from the aforementioned end 15a with a bent part 19 which is bent substantially perpendicularly in the direction departing from the resilient piece 17. This bent part 19 serves to determine the fixing position of the fastener member itself and absorb the external stress exerted in the direction of the length of the fastener member (as will be described more fully afterward).

Now, the preferred structure given to the lamp housing 1 of the present embodiment will be described. On the side walls of the lamp case 2, a plurality of ribs 20 extended inwardly from the lower edge of the flange 4 and raised outwardly are disposed as spaced laterally. The size of the imaginary rectangular line enveloping the upper edges of these ribs close to the flange 4 is either equal to or slightly smaller than the insertion hole 6 formed in the body panel. When the lamp case 2 is inserted through the insertion hole 6 until the flange 4 engages the body panel, the upper edges of the individual ribs 20 either come into intimate contact with the edge of the insertion hole or closely approach the edge.

One of the functions to be fulfilled by these ribs 20 resides in determining the position of the lamp case 2 and consequently that of the lamp housing 1 as a whole as the lamp case is inserted fully into the insertion hole 6. Optionally the ribs 20 may be adapted so that they may fulfill the role of determining the positions of the fastener members 14 which are to be attached in position to the side wall of the lamp case 2 through the medium of the two-faced adhesive tape 16 attached to the rear sides of the fixing parts 15 and the role of preventing the fastener members already attached to the side wall from sliding sideways.

The fastener members 14, as illustrated in FIG. 3, FIG. 5, and FIG. 4 (with a chain line), are disposed at least one each on the four side walls of the lamp case 2. (In FIG. 3, two fastener members are provided in each of the longer side walls and one fastener member in each of the shorter side walls.) If the side walls are flat, the selection of proper locations for the attachment of these fastener members entails uncertainty and necessitates troublesome work of adopting templates or inscribing proper marks in the side walls. When the ribs are provided as in the present embodiment, some of the ribs may be located at the positions at which the opposite sides of the fastener members are expected to fall and these ribs designated for attachment of the fastener members. Then, the workers engaging in the attachment of fastener members to the lamp case are allowed to find the exact locations for the attachment of the fastener members without experiencing any uncertainty.

After the fastener members have been attached fast to the side walls as described above, since the opposite sides of the fastener members are held fast by the ribs 20, the fastener members are prevented from sliding sidewise. Such retaining ribs may well be regarded as fulfilling the part of baffles capable of preventing lateral outer force from being directly exerted upon the fastener members attached with the medium of adhesive tape to the side walls.

The same measures for the positioning of the individual fastener members and for preventing the fastener members from sliding sidewise as described above with respect to the lateral direction of the lamp case are desired to be taken similarly in the longitudinal direction, namely in the direction in which the resilient pieces 17 of the fastener members are extended or in the direction from the flange to the bottom of the lamp case 2.

In the present embodiment, therefore, as briefly touched upon previously, the fastener members are each provided with a bent part 19 which is bent downwardly from the fixing part end 15b. Thus, the lamp case 2 is provided with openings 21 which are adapted to admit these bent parts 19 when the fixing parts 15 are attached at prescribed positions to the side walls of the lamp case through the medium of the adhesive tape 16. In this case, these openings are formed along the joint between the main body of the lamp case 2 and the flange 4 so as to facilitate release of these openings 21 from the mold.

Conversely, the measures for the positioning and the prevention of sidewise slide are automatically fulfilled by causing the fastener members to be attached with adhesive tapes 16 to the side walls of the lamp case so that the bent parts 19 may snugly enter the openings 21 between the designated ribs 20.

The relevant parts are designed so that when the fastener members are attached as described above, the engaging faces of the fastener members are naturally brought in position to be safely engaged with the rear side of the edge of the insertion hole 6 in the body panel by the fixing work to be described fully afterward. Further, as clearly noted from the fastener member 14 indicated with a chain line in FIG. 4, the fastener member 14 and the rib 20 are desired to be designed so that, as observed sidewise, the fastener member 14 is substantially concealed by the rib 20 and the free end 17b of the resilient piece 17 and the corner of the engaging face 18 slightly protrude from the boundary of the rib.

When the prescribed plurality of fastener members 14 are suitably attached to the side walls of the lamp case 2, a seal packing 12 is set in position along the lower edge of the flange 4 and, subsequently, the lamp case 2 is lowered in the direction of its bottom and inserted in that direction through the insertion hole 6 formed in the body panel 5.

Consequently, owing to the dimensional relationship described above, the resilient pieces 17 of the fastener members 14 which protrude from the ribs 20 engage the edge of the insertion hole 6. Then, they are pushed inwardly by the edge as they slip past the edge of the hole. About the time that the seal packing 12 is nipped with moderate pressure between the flange 4 and the body panel 5, the resilient pieces 17 slide past the rear side of the edge of the insertion hole and regain their original shape, causing the engaging faces 18 thereof to come into fast engagement with the rear side of the edge of the insertion hole (FIG. 5).

In accordance with this invention, the attachment of the lamp housing to the automobile is accomplished on one side of the body panel by simple work of pushing the lamp housing into the insertion hole. Furthermore, all the aforementioned drawbacks (1) through (6) suffered by the conventional fixing structure are completely eliminated by the present invention.

Where the lamp housing is desired to offer enhanced resistance to the force exerted upon the lamp housing in the direction of separating it from the body panel, a proper adhesive agent may be used in addition to or in place of the aforementioned two-faced adhesive tape 16. Otherwise, as illustrated in FIG. 6, the bent parts 19 may be substituted with inversed L hooks adapted to catch hold of the edges of the openings 21, so that when the departing force in the direction of the arrow A is exerted upon the lamp housing, this force may energize the engaging faces 18 in the same direction and cause the L hooks to be pressed more forcibly against the edge of the insertion hole 6 (which is not shown in FIG. 6). It is naturally permissible that the bent parts or the projecting parts may be formed on the lamp case and the openings or recesses for admitting such bent parts or projecting parts may be formed on the fastener members.

Optionally, the two-faced adhesive tape used for the attachment of the fastener members 14 to the side walls of the lamp case may be supplemented with a proper snap-in selected from among those fasteners known to the art, such as is illustrated in FIG. 7, for example, which is used in lieu of bent hook part 19. The snap-in fastener 22 illustrated in FIG. 7 is of the so-called anchor type. It comprises a shank 23 extended downwardly from the lower side of the fixing part 15 of the fastener member 14 and a pair of resilient engaging pieces 24 extended aslant upwardly as though folded back from the neighborhood of the tip of the shank 23. An engaging hole 25 for admitting the snap-in fastener 22 is formed at a prescribed position in the lamp case 2. When the fastener member is placed directly above the engaging hole 25 and the resilient piece 24 is slid through the engaging hole 25 and allowed to regain its original shape behind the engaging hole 25, the engaging face 26 near the leading end of the resilient engaging piece comes into fast engagement with the rear side of the edge of the hole. In this way, the attachment of the fastener member 14 to the lamp case is accomplished. Of course, the two-faced adhesive tape may be used as an aid.

The embodiment described so far represents a case wherein the lamp housing 1 assumed to be a rear combination lamp housing is directly opposed to the plane of the insertion hole 6 in the body panel and pushed straight into the insertion hole 6. Even for use in the rear combination lamp, the fixing structure sometimes is required to be designed as illustrated in FIG. 8 so that the cover 7 is curved from the rear panel side 5a through the lateral panel side 5b of the body panel 5. In this particular construction, a support plate member 26 is raised from the bottom side of the lamp case 2 close to the outer lateral side, and fastener members 14 are attached to the other lateral side similarly to those in the preceding embodiment. First, the base of the support plate member 26 is applied to the rear side of the lateral panel 5b as indicated by the chain line. Then, the housing as a whole is turned into position as indicated by the arrow B, with the support plate member 26 serving as a fulcrum.

The rear combination lamp is not the only subject matter of this invention. The fixing structure of this invention may be adapted for use with a side marker, for example, which is attached to the front lateral panel 5c of the automobile. In this case, the lamp housing 1 is very small as compared with that for use with the rear combination lamp, although it is still large as compared with the fastener member 14. Thus, the number of fastener members 14 to be attached to the lamp case 2 may be one each for the opposite shorter side walls as illustrated. In this case, the fastener members of the design illustrated in FIGS. 6-7 can be adopted as a matter of course.

In any of the embodiments cited above, whenever the lamp housing is required to be removed from the body panel, desired removal is accomplished by bending the resilient pieces 17 of the fastener members inwardly behind the body panel and then pulling the housing out of the body panel.

The effects of the present invention may be summarized as follows.

(a) The trouble otherwise involved in the insert molding of bolts is eliminated. The mold for the relatively large housing is not required to include cavities for fastener members which demand dimensional accuracy and which are released from the mold with great difficulty. The mold, therefore, proves advantageous from the standpoint of cost and enjoys relatively high dimensional accuracy.

(b) The attachment of the fixing structure is effected by the so-called one-side work performed on the front side of the body panel, and that without use of any tool. The only work required is to push the lamp case into the insertion hole. This fixing structure, therefore, enjoys high workability.

(c) The insertion hole for admitting the lamp case is the only hole to be formed in the body panel. Thus, the fixing structure of this invention excels in workability in the phase of perforation. The special consideration heretofore required to be paid to the accurate location of fixing holes formed along the edge of the insertion hole in the conventional fixing structure is no longer required.

(d) If a seal packing 12 is used in the fixing structure of this invention, the holes formed along the edge of the insertion hole for the passage of bolts and fasteners in the conventional fixing structure are no longer required. Thus, the sealing area as well as the workability of the seal packing 12 itself remains intact.

(e) Since the fastener members 14 are separate components in the fixing structure of the present invention, they enjoy high adaptability to lamp housings of various sizes and designs. The fatal disadvantage of the conventional fixing structure that fastener members are redesigned whenever housings are varied in size and design is completely eliminated.

I claim:

1. A fastening system for mounting a lamp housing within an aperture formed within a body panel, having an interior face and an exterior face, of an automobile within which the housing is adapted to be securely mounted and fastened, comprising:

peripheral flange means formed upon said housing for engaging said exterior face of said panel within which said housing is to be disposed;

pairs of laterally spaced ribs fixedly secured upon said housing about the periphery thereof and at positions axially interiorly of said peripheral housing flainge means as viewed in the direction of insertion of said housing into said panel aperture and including inclined surface means at the forward ends thereof, as viewed in the direction of insertion of said housing into said panel aperture, for engagement with the peripheral walls of said panel which define said panel aperture so as to initially guide said housing toward the center of said panel aperture during axial insertion of said housing into said panel; and fastening means, separate from said panel and said housing, disposed about said periphery of said housing, and interposed between said pairs of ribs so as to be laterally confined thereby, including first means for fixedly securing said fastening means within said housing, and second means flexibly connected to said first means for engaging said peripheral walls of said panel which define said panel aperture so as to be initially flexibly deflected from an original position by said peripheral walls of said panel as said housing is inserted within said panel, and subsequently expanded back to its original position so as to engage said interior face of said panel thereby lockingly retaining said housing within said panel when said housing is fully inserted within said panel, the fastening means having an axial length, as viewed in the direction of insertion of said housing into said panel aperture, which is less than that of said pairs of ribs so as to be axially recessed between said pairs of ribs and thereby permit said forward inclined surfaces of said pairs of ribs to perform said initial guiding function of said housing toward said center of said panel aperture, and said second means of said fastening means having a height, when disposed at said undeflected original position, which is greater than the vertical extent of said pairs of ribs so as to extend radially outwardly beyond said pairs of ribs and thereby be engageable with said peripheral walls of said panel which define said panel aperture for secondarily continuing said guiding movement of said housing toward said center of said panel aperture, as initiated by said inclined forward surfaces of said pairs of ribs, during said axial insertion of said housing into said panel aperture.

2. A fastening system as set forth in claim 1, wherein: said first means of said fastening means comprises two-sided adhesive tape.

3. A fastening system as set forth in claim 1, wherein: said first fastening means comprises anchor-shaped fasteners for engaging apertures formed within said housing.

4. A fastening system as set forth in claim 1, wherein: said first fastening means comprises a substantially L-shaped hook-type fastener for disposition within an aperture formed within said housing.

5. A fastening system as set forth in claim 1, wherein: said first and second means of said fastening means are integrally formed together.

6. A fastening system as set forth in claim 1, wherein:
said second fastening means overlies said first means of said fastening means in such a manner that said first and second means of said fastening means form a V-shaped fastening means.

7. A fastening system for mounting a housing within an aperture formed within a panel, having an interior face and an exterior face, within which the housing is adapted to be securely mounted and fastened, comprising:

peripheral flange means formed upon said housing for engaging said exterior face of said panel within which said housing is to be disposed;

pairs of laterally spaced ribs fixedly secured upon said housing about the periphery thereof and at positions axially interiorly of said peripheral housing flange means as viewed in the direction of insertion of said housing into said panel aperture and including inclined surface means at the forward ends thereof, as viewed in the direction of insertion of said housing into said panel aperture, for engagement with the peripheral walls of said panel which define said panel aperture so as to initially guide said housing toward the center of said panel aperture during axial insertion of said housing into said panel; and fastening means, separate from said panel and said housing, disposed about said periphery of said housing, and interposed between said pairs of ribs so as to be laterally confined thereby, including first means for fixedly securing said fastening means within said housing, and second means flexibly connected to said first means for engaging said peripheral walls of said panel which define said panel aperture so as to be initially flexibly deflected from an original position by said peripheral walls of said panel as said housing is inserted within said panel, and subsequently expanded back to its original position so as to engage said interior face of said panel thereby lockingly retaining said housing within said panel when said housing is fully inserted within said panel, said fastening means having an axial length, as viewed in the direction of insertion of said housing into said panel aperture, which is less than that of said pairs of ribs so as to be axially recessed between said pairs of ribs and thereby permit said forward inclined surfaces of said pairs of ribs to perform said initial guiding function of said housing toward said center of said panel aperture, and said second means of said fastening means having a height, when disposed at said undeflected original position, which is greater than the vertical extent of said pairs of ribs so as to extend radially outwardly beyond said pairs of ribs and thereby be engageable with said peripheral walls of said panel which define said panel aperture for secondarily continuing said guiding movement of said housing toward said center of said panel aperture, as initiated by said inclined forward surfaces of said pairs of ribs, during said axial insertion of said housing into said panel aperture.

8. A fastening system as set forth in claim 7, wherein:
said housing is a lamp housing.

9. A fastening system as set forth in claim 7, wherein:
said panel is a body panel of an automobile.

* * * * *